United States Patent [19]
Bojar

[11] Patent Number: 5,495,896
[45] Date of Patent: *Mar. 5, 1996

[54] ADJUSTABLE PITCH GARDEN HOE TOOL

[76] Inventor: James A. Bojar, 53226 Pasadena Blvd., Wauwatosa, Wis. 53226

[ * ] Notice: The term of this patent shall not extend beyond the expiration date of Pat. No. 5,285,855 and D. 343,556.

[21] Appl. No.: 192,613

[22] Filed: Feb. 7, 1994

Related U.S. Application Data

[63] Continuation-in-part of Ser. No. 16,252, Feb. 11, 1993, Pat. No. 5,285,855.

[51] Int. Cl.$^6$ .................................. A01B 1/06; A01B 1/22
[52] U.S. Cl. ............................................ 172/372; 294/53.5
[58] Field of Search .................................. 172/372, 374, 172/371, 376, 377, 380, 381; 403/83, 98, 104, 103, 107, 329

[56] References Cited

U.S. PATENT DOCUMENTS

| | | | |
|---|---|---|---|
| D. 332,207 | 1/1993 | Bojar | D8/11 |
| D. 343,556 | 1/1994 | Bojar | D8/11 |
| D. 348,185 | 6/1994 | Bojar | D8/11 |
| D. 359,206 | 6/1995 | Bojar | D8/11 |
| 386,197 | 7/1888 | Hain | 172/376 |
| 568,143 | 9/1896 | Parcells | 172/376 |
| 824,862 | 7/1906 | Hilton | 172/375 |
| 854,424 | 5/1907 | Ketterer | 403/98 |
| 1,334,586 | 3/1920 | Baker | 172/376 |
| 1,591,280 | 7/1926 | Carr . | |
| 1,627,901 | 5/1927 | Hills | 172/376 |
| 1,870,891 | 8/1932 | Bristow | 172/376 |
| 1,886,178 | 11/1932 | Goddard . | |
| 1,895,055 | 1/1933 | Steinour . | |
| 1,940,169 | 12/1933 | Hinton . | |
| 2,652,680 | 9/1953 | Adams . | |
| 3,367,689 | 2/1968 | McCarthy | 403/107 |
| 4,247,216 | 1/1981 | Pansini | 403/329 |
| 4,639,039 | 1/1987 | Donovan | 403/107 |

FOREIGN PATENT DOCUMENTS 10081 of 1887 United Kingdom .

Primary Examiner—Randolph A. Reese
Assistant Examiner—Spencer Warnick
Attorney, Agent, or Firm—Robert T. Johnson

[57] ABSTRACT

Disclosure is made of an adjustable pitch garden hoe tool, as an article of maufacture wherein the pitch of the head assembly can be adjusted to control the dig or "bite" into the soil and comprises ferrule legs mounted on an extended handle and adjustable pitch garden hoe tool head mounted on the ferrule legs, and a compression V spring mounted within the ferrule legs and arms of the compression V spring extending into pitch set slots and pitch set stops in vertical sides of the garden tool head.

5 Claims, 2 Drawing Sheets

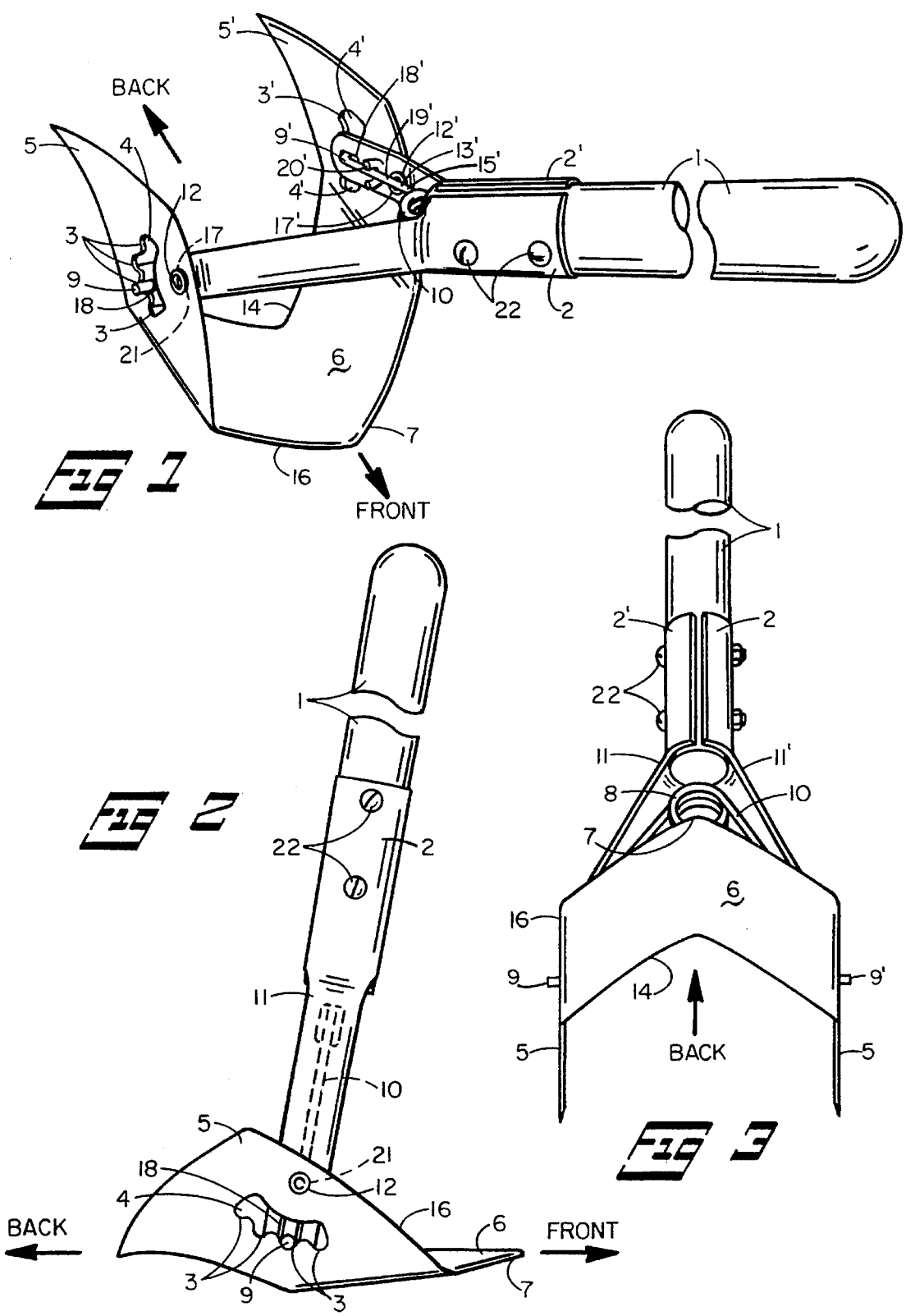

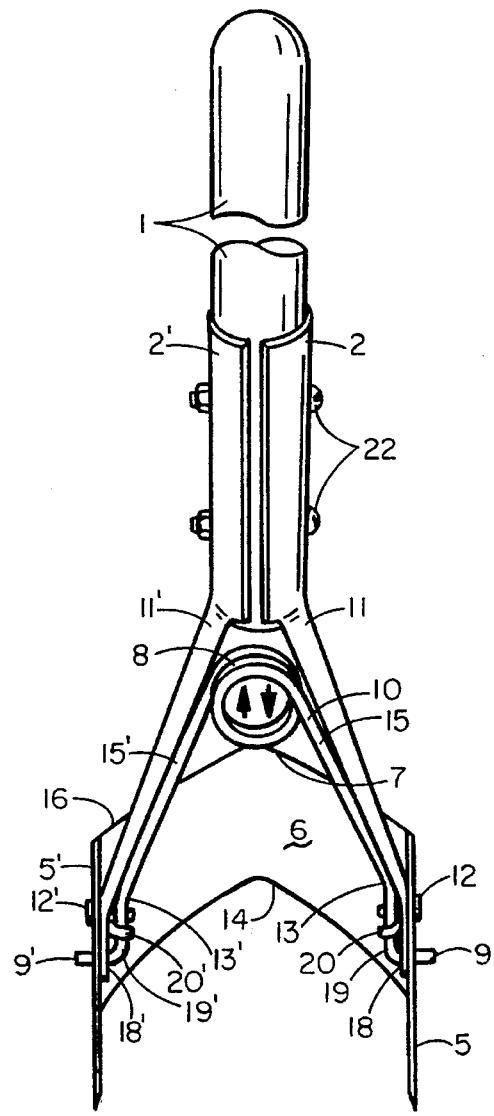
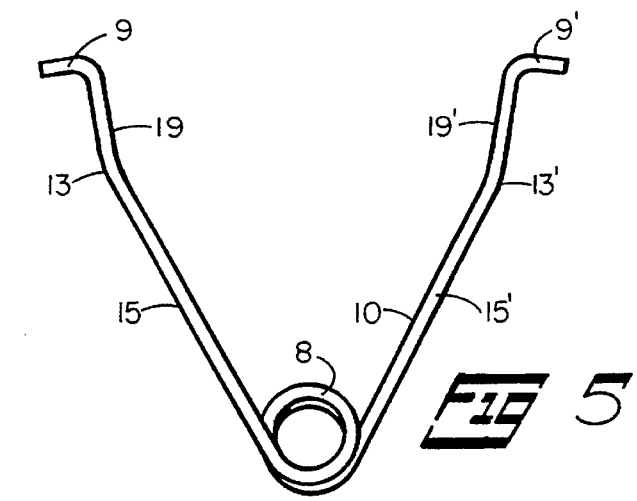
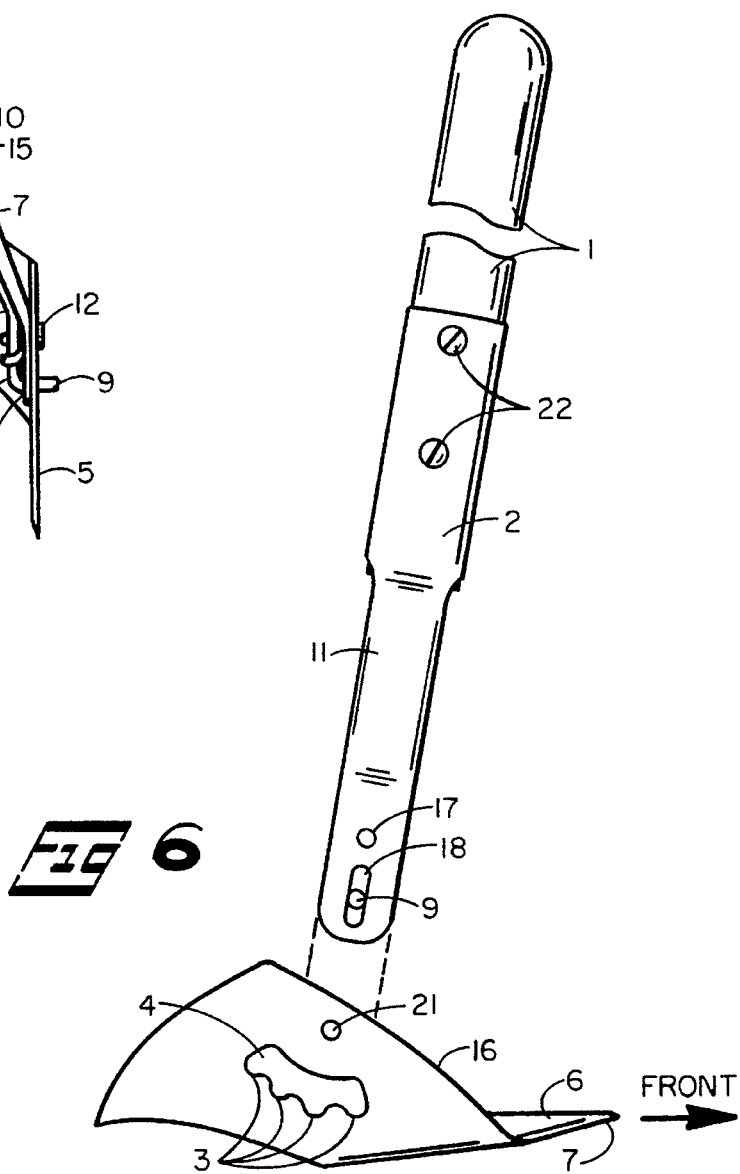

ADJUSTABLE PITCH GARDEN HOE TOOL

This Application is a Continuation-In-Part of Application Ser. No. 08/016,252, filed Feb. 11, 1993, now U.S. Pat No. 5,285,855, for ADJUSTABLE PITCH GARDEN HOE TOOL This present Application relates to a garden hoe tool having an adjustable pitch head readily and easily locked in a desired pitch position.

BACKGROUND OF THE INVENTION

This invention relates to a manufacture, as an adjustable pitch garden hoe, wherein the pitch of head assembly can be adjusted to control the dig or bite into the soil. To date the usual garden hoe has a fixed head that is not adjustable thus the dig or bite into the soil cannot be easily controlled.

Prior art citations are:
U.S. Pat. No. 386,197 for: HOE. Disclosure is made in this patent of a hoe blade comprising a wedge shaped horizontal blade.
U.S. Pat. No. 568,143 for: SHUFFLE HOE. Disclosure is made of a cutting blade and side wings.
U.S. Pat. No. 824,862 for: HOE. Disclosure is made of a hoe designed as a mulching tool.
U.S. Pat. No. 1,334,586 for: GARDEN WEEDER. In this patent disclosure is made to have an adjustable head to adjust the position of the blade.
U.S. Pat. No. 1,591,280 for: HANDLE FASTENING FOR HOES. Disclosure is made of a scuffle hoe with an adjustable handle.
U.S. Pat. No. 1,627,901 for: BARK PEELER. Disclosure is made of adjustable blade section.
U.S. Pat. No. 1,870,891 for: LAWN AND GARDEN IMPLEMENT. Disclosure is made of a tool for gardening lawn edging etc.
Other patents for the record are; U.S. Pat. No. 1,895,055, U.S. Pat. No. 1,940,169, German pat. #606411.

An object of this invention application, is to disclose as a manufacture, an adjustable pitch garden hoe tool having a handle with ferrule legs attached thereto and a hoe tool head attached to the ferrule legs by means of a fastening pivot pin and a V spring with arms extending outward from legs of the V spring, and the arms extending through the ferrule legs and into a pitch set slot and into pitch set stops, and the compression V spring movable along the long axis to move the arms from and to the pitch set slot and pitch set stops. The above mentioned fastening pivot pin includes either a bolt or a rivet as a substitute for the fastening pivot pin, Another object of this invention is to disclose as a manufacture an adjustable pitch garden hoe tool having a handle and ferrule legs attached thereto and a hoe tool head attached to the ferrule legs by means of a fastening pivot pin and mounted within the ferrule legs is a V spring with arms extending from legs of the V spring, and the arms extending through holes or apertures in the ferrule legs and into pitch set slots and pitch set stops in each vertical side of the base blade and the bottom of the V spring extending toward the handle end with clearance between the handle end and bottom of the V spring coil.

Another object of this invention of a manufacture of an adjustable pitch garden hoe tool is to disclose a compression V spring having a bend in each leg and an arm extending outward from each leg, and leg segments between each leg bend and arm of each leg segment are parallel, when the compression spring is assembled in the adjustable pitch garden hoe tool head.

SUMMARY OF INVENTION

This invention provides, as a manufacture, an adjustable pitch garden hoe tool having a head with a modified V shaped hoe blade base and vertical sides on the hoe blade base and a compression V spring fitting between ferrule legs, and the legs attached on one end thereof to an extended handle and the opposite ends of the ferrule legs, to each of which is attached its respective vertical side of the hoe blade base by means of fastening pivot pins and each arm of compression V spring legs extending into a pitch set slot and into pitch set stops on adjustment of the pitch by means of withdrawal of the V spring arms from pitch set stops, and leg segments of the compression V spring are parallel to each other on assembly of the adjustable pitch garden hoe tool.

The compression spring of this invention may be described as a modified V spring, with a coil at the apex, thus the compression V spring 10, is to include the coil at the apex.

BRIEF DESCRIPTION OF DRAWINGS

FIG. 1 Perspective view of ADJUSTABLE PITCH GARDEN HOE TOOL.

FIG. 2 Elevation view of left side.

FIG. 3 Upward plan view.

FIG. 4 Downward plan view.

FIG. 5 V spring.

FIG. 6 Elevation view of dis-assembly of hoe tool head from ferrule legs and handle.

LEGENDS OF DRAWINGS

1—Handle.
2, 2'—Ferrule mount segments.
3, 3'—Pitch set stops.
4, 4'Pitch set slots.
5, 5'—Vertical sides of base blade.
6—Garden hoe tool base blade.
7—Front edge of garden hoe tool base blade.
8—Spring coil base of V spring.
9, 9' Arms of V spring legs.
10—Compression V spring.
11,11' Ferrule legs.
12, 12'—Fastening pivot pins.
13, 13'—Leg bend.
14—Back edge of garden hoe tool base blade.
15, 15' Legs of V spring.
16—Adjustable pitch garden hoe tool head.
17, 17' Holes in ferrule legs for fastening pivot pins.
18, 18' Holes or apertures in ferrule legs for arms of spring legs.
19, 19' Leg segments between leg bends 13, 13' and arms 9, 9' of V spring legs 15, 15'0 of compression spring 10.
20, 20' Guides for leg segments 19, 19' on inside of ferrule legs 11, 11'.
21, 21' Holes in vertical sides of base blades.
22—Bolts attaching ferrule mount segments of ferrule legs to handle.

DETAILED DESCRIPTION OF INVENTION

The description which follows discloses, as an article of manufacture, an adjustable pitch garden hoe tool of a handle 1, to which is attached by means of bolts 22 ferrule mount segments 2, 2' and ferrule legs 11, 11' attached to the ferrule mount segments 2, 2'. The adjustable pitch segment of this garden hoe tool head 16 is an assembly of garden hoe tool base blade 6, and two vertical sides 5, 5' of garden hoe tool base blade 6. The base blade 6, and vertical sides 5, 5' of base blade 6 is a unitary or single unit garden hoe tool head 16 and is adjustable for the variable pitch of hoe tool head 16. The vertical sides 5, 5' attached to the sides of base blade 6 are mounted on the ends of ferrule legs 11, 11' by means of fastening pivot pins 12, 12' to thus allow pivoting of hoe tool head 16, in an up and down direction. (see FIG. 1)

To adjust the pitch of the hoe tool head 16, in each of the vertical sides 5, 5' there is a pitch set slot 4, 4' and each slot is arc shaped on a radius having the fastening pivot pins 12, 12' as the center point. The arms 9, 9' extending outwards from legs 15, 15' of compression V spring 10 extend into their respective slot 4, 4' in vertical sides 5, 5' of base blade 6. The slots 4, 4' are of such width to allow arms 9, 9' of V spring 10 to travel easily therein. (see FIG. 2)

On adjustment of the pitch of the garden hoe tool, the hoe tool head 16 is to be locked in the adjusted position by means of arms 9, 9' of V spring legs 15, 15'. The arms 9, 9' of V spring legs 15, 15' extending into pitch set slots 4, 4' slide into pitch set stops 3, 3' on release of compression V spring 10. Spring 10 on being forced downward to withdraw the arms 9, 9' from pitch set stops 3, 3' allows setting of the pitch of hoe tool head 16. (see FIG. 4)

The compression spring 10, is mounted in the fork of the mounted ferrule legs 11, 11' and is held in position by mounting of arms 9, 9' in pitch set slots 4, 4' and extending into pitch set stops 3, 3'. The legs 15, 15' of compression V spring each have a leg bend 13, 13' extending inward so that leg segments 19, 19' are parallel each to the other on assembly and these leg segments 19,19' on compression V spring 10, reciprocate in guides 20, 20' located on the inside of ferrule legs 11, 11'. (see FIG. 5)

Reference is now made to FIG. 2, where the legend 7 front edge of garden hoe tool base blade is shown and legend 14 back edge of garden hoe tool base blade is shown of the garden hoe tool head 16.

In the above discussion, for identification purpose the legends with a "prime"(') indication are on one side of the garden hoe tool head 16, and the prime legends are in general a mirror image of the non-prime legends.

Holes or apertures 18, 18' in ferrule legs provides for arms 9, 9' to extend through the ferrule legs and align with and extend into respective pitch set slots 4, 4' and pitch set stops 3, 3' thus the arms 9, 9' of V spring legs extend through the holes 11, 11' in their respective ferrule leg and into the pitch set slots 4, 4' and pitch set stops 3, 3'.

Holes 18, 18' are slotted to allow movement of arms 9, 9' of V spring 10 in pitch set slots 4, 4' and pitch set stops 3, 3' on adjusting the pitch of the hoe tool head 16.

Reference is now made to FIGS. 1, 2, 3, and 4 to identify the legend 7, front edge of garden hoe tool base blade.

The V spring of this invention is shown in FIG. 5, and as shown legend 8, spring coil base of V spring may be a single or multi-coil, or a plain V base or apex without a coil.

To adjust the pitch of the garden hoe tool head 16, the compression V spring 10 is forced downward toward the handle 1 which withdraws the arms 9, 9' down from the pitch set stops 3,3', and into pitch set slots 4, 4', at which time the pitch is adjusted as desired and on release of the V spring 10, the arms 9, 9' slide into the desired pitch set stops 3, 3' to lock the tool head in the desired pitch or angle for use.

Reference is now made to FIG. 4 wherein directional arrows are shown to indicate that the compression V spring reciprocates in a lengthwise direction which serves to release the arms 9, 9' of V spring 10 from the pitch set stops 3, 3' to set the pitch of the hoe tool head It is to be pointed out that legends 17, 17' for holes in ferrule legs for fastening pivot pins 12, 12' are aligned with holes in 5, 5' vertical sides of base blades to allow for pitch adjustment of the garden hoe tool head 16, and further the holes 18, 18' in the ferrule legs 11, 11' are oblong or of a slot shape to allow for movement of the arms 9, 9' in ferrule legs 11, 11' to move up and down between pitch slots 4, 4' and pitch set stops 3, 3' to thus adjust the pitch of adjustable pitch garden hoe tool head 16.

A minimum of two pitch set stops 3, 3' adjoining each of pitch set slots 4, 4' but a plurality greater than two pitch set stops 3, 3' is preferred.

Referring now to FIGS. 1–4, the garden hoe tool base blade 6 is of a modified V shape, with the "point" extending forward and is identified as legend 7, front edge of garden hoe tool base blade and legend 14 is back edge of garden hoe tool base blade.

The guides 20, 20' for leg segments 19, 19' of compression V spring 10 may be merely pins, a pair on each ferrule leg 11, 11' for guiding of the leg segments 19, 19' in their up and down movements of the V spring 10 to allow adjustment of the pitch of the garden hoe tool head.

On assembly of the hoe tool head 16 to the ferrule legs 11–11' holes 21, 21' in vertical sides 5, 5' of base blade align with holes 17, 17' in ferrule legs for insertion of fastening pivot pins 12, 12' and the compression V spring 10 is mounted as outlined above with arms 9, 9' extending through slotted holes 18, 18' in ferrule legs 11, 11' and into pitch set slots 4, 4' and pitch set stops 3, 3' to adjust to the desired pitch of the hoe tool head 16.

The arms 9, 9' extending outward from leg segments 19, 19' of the compression spring 10, mounted between ferrule legs 11, 11' extend into pitch set stops 3, 3' in normal operating mode when the pitch is set for desired use. The leg segments 19, 19' of compression V spring 10, are essentially parallel each to the other when mounted in the adjustable pitch garden hoe tool. As described above the arms 9, 9' are forced into the pitch set slots 3, 3' due to the nature of the compression spring 10 which forces the legs 15, 15' and leg segments 19, 19' in a direction away from the handle 1, and the arms 9, 9' are withdrawn from the pitch set slots 3, 3' by hand forcing the spring coil base 8 of the V spring in a direction toward the handle 1, which then brings the whole V spring including the legs 15, 15' leg segments 19, 19' and arms 9, 9' toward the handle.

The front edge 7, of garden hoe tool base blade, and back edge 14 of the garden hoe tool base blade, and edges of vertical sides of the base blade 6 may be sharpened to facilitate use of this adjustable pitch garden hoe tool.

In the above discussion apertures may be referred to in the alternate as holes which are identified as oblong or slotted. The word "spring" may be used as an alternate to "compression V spring 10".

Having described my invention I claim:

1. As an article of manufacture, an adjustable pitch garden hoe tool comprising:

a  a handle;

b  ferrule leg mount segments attached to said handle;

c  a base blade being mounted on said ferrule leg mount segments by means of fastening pivot pins so that the base blade may pivot on said ferrule leg mount segments;

d a compression V spring mounted between said ferrule leg mount segments, said compression V spring having two legs;

e arms attached to the legs of said compression V spring which extend into pitch set slots and pitch set stops in vertical sides of said base blade; and f said arms of said compression V spring are movable back and forth from and into said pitch set stops to adjust the angle of said base blade with respect to the ferrule leg mount segments.

2. An adjustable pitch garden hoe tool as in claim 1, wherein:

a said compression V spring legs have inward bends at a distance from a coil segment of said compression V spring;

b said arms being located on the ends of said legs of said compression V spring;

c said legs between said arms and said inward bends being parallel;

d said ferrule leg mount segments each including guides on an inner surface; and e said arms of said compression V spring legs extending through apertures in said ferrule leg mount segments and into said pitch set slots and said pitch said stops of said base blade.

3. An adjustable pitch garden hoe tool of claim 2, wherein:

a said vertical sides of said base blade each contain a pitch set slot; and b each pitch set slot includes at least two pitch set stops adjoining said pitch set slot.

4. An adjustable pitch garden hoe tool of claim 3 wherein:

a said compression V spring mounted in said ferrule leg mount segments is pivotally attached to said ferrule leg mount segments.

5. An adjustable pitch garden hoe tool of claim 4 wherein:

a said pitch set slot in each vertical side of said base blade is arcuate with said fastening pivot pin means as the center point of said arc.

\* \* \* \* \*